(12) United States Patent
Huang et al.

(10) Patent No.: US 9,309,628 B2
(45) Date of Patent: Apr. 12, 2016

(54) WALLPAPER AND METHOD FOR MANUFACTURING SAME

(75) Inventors: Cheng Zhe Huang, Cheongju (KR); Si Young Lee, Cheongju (KR); Phan Seok Kim, Cheongju (KR)

(73) Assignee: LG HAUSYS, LTD., Seoul (KR)

( * ) Notice: Subject to any disclaimer, the term of this patent is extended or adjusted under 35 U.S.C. 154(b) by 59 days.

(21) Appl. No.: 13/126,717

(22) PCT Filed: Oct. 27, 2009

(86) PCT No.: PCT/KR2009/006232
§ 371 (c)(1),
(2), (4) Date: Apr. 28, 2011

(87) PCT Pub. No.: WO2010/050730
PCT Pub. Date: May 6, 2010

(65) Prior Publication Data
US 2011/0217523 A1    Sep. 8, 2011

(30) Foreign Application Priority Data
Oct. 30, 2008  (KR) .................. 10-2008-0107230

(51) Int. Cl.
| B32B 27/10 | (2006.01) |
| D21H 27/20 | (2006.01) |
| B32B 27/36 | (2006.01) |
| B32B 27/30 | (2006.01) |
| B32B 3/10  | (2006.01) |

(52) U.S. Cl.
CPC *D21H 27/20* (2013.01); *B32B 3/10* (2013.01); *B32B 27/10* (2013.01); *B32B 27/308* (2013.01); *B32B 27/36* (2013.01); *Y10T 428/24802* (2015.01); *Y10T 428/25* (2015.01); *Y10T 428/251* (2015.01); *Y10T 428/266* (2015.01); *Y10T 428/31504* (2015.04); *Y10T 428/31855* (2015.04); *Y10T 428/31971* (2015.04); *Y10T 428/31993* (2015.04); *Y10T 442/674* (2015.04)

(58) Field of Classification Search
None
See application file for complete search history.

(56) References Cited

U.S. PATENT DOCUMENTS

| 4,259,386 A * | 3/1981 | Wagstaffe ..................... 428/159 |
| 2004/0068059 A1* | 4/2004 | Katayama et al. ............ 525/466 |
| 2006/0194004 A1* | 8/2006 | Niemoller et al. ......... 428/32.11 |
| 2007/0088099 A1* | 4/2007 | Mentink et al. ................ 523/124 |
| 2008/0176968 A1* | 7/2008 | VanSumeren et al. .......... 521/97 |

(Continued)

FOREIGN PATENT DOCUMENTS

| CN | 1172129 A   | 4/1998 |
| EP | 0 038 884 A1 | 11/1981 |
| EP | 0 564 712 A1 | 10/1993 |

(Continued)

OTHER PUBLICATIONS

International Search Report for PCT/KR2009/006232 on Oct. 27, 2009.

*Primary Examiner* — Gerard Higgins
*Assistant Examiner* — Sathavaram I Reddy

(57) ABSTRACT

The present invention relates to wallpaper and a method for manufacturing the same. The wallpaper may be manufactured at low energy and low costs regardless of an increase in oil price and does not produce greenhouse gases and hazardous substances in the course of manufacture, use or disposal, or during fire. In addition, the wallpaper can decompose readily in the natural environment, even when buried.

19 Claims, 1 Drawing Sheet

(56) References Cited

U.S. PATENT DOCUMENTS

2009/0030132 A1* 1/2009 Kumazawa et al. .......... 524/493
2009/0258175 A1* 10/2009 Matsuoka et al. ........... 428/36.5

FOREIGN PATENT DOCUMENTS

| | | |
|---|---|---|
| EP | 1 837 363 A1 | 9/2007 |
| EP | 1 944 333 A1 | 7/2008 |
| JP | 6-47400 U | 6/1994 |
| JP | 7257554 A | 9/1995 |
| JP | 2004-292719 A | 10/2004 |
| JP | 2004-293005 A | 10/2004 |
| JP | 2005-015783 A | 1/2005 |
| JP | 3111303 U | 1/2005 |
| JP | 2005-240315 A | 9/2005 |
| JP | 2008-184728 A | 8/2008 |
| KR | 100280334 B1 | 9/2000 |
| KR | 1020020080054 A | 10/2002 |
| WO | WO 98/58798 A1 | 12/1998 |
| WO | WO 2007007435 A1 * | 1/2007 |
| WO | WO 2007052543 A1 * | 5/2007 |

* cited by examiner

WALLPAPER AND METHOD FOR MANUFACTURING SAME

TECHNICAL FIELD

The present invention relates to wallpaper and a method for manufacturing the same.

BACKGROUND ART

Polyvinyl chloride (PVC) wallpaper is manufactured by coating a base material, such as paper, with PVC. The PVC wallpaper, commonly known as silk wallpaper, is widely used. However, since the PVC wallpaper is made entirely from nonrenewable fossil energy resources, difficulties in supply and demand of raw materials and price increase are expected to occur in the future with the exhaustion of petroleum. Further, the PVC wallpaper generates a large amount of greenhouse gases, for example, $CO_2$, in a manufacturing process, and produces environmental hormones and noxious gases when burned or in case of fire. Further, when buried, the PVC wallpaper remains almost permanently in the natural world, causing serious environmental problems.

DISCLOSURE

Technical Problem

An aspect of the present invention is to provide wallpaper and a method for manufacturing the same.

Technical Solution

In accordance with one aspect of the invention, wallpaper includes a base sheet and a resin layer formed on the base sheet and including a biodegradable resin.

In accordance with one aspect of the invention, a method for manufacturing wallpaper includes forming a resin layer on a base sheet using a resin composition including a biodegradable resin.

Advantageous Effect

According to exemplary embodiments of the invention, wallpaper may be manufactured at low energy and low costs regardless of an increase in oil price and does not produce greenhouse gases and hazardous substances manufacture, use or disposal, or during fire. In addition, the wallpaper can readily decompose in the natural environment even when buried.

BEST MODE

The present invention relates to wallpaper including a base sheet and a resin layer formed on the base sheet and including a biodegradable resin.

Hereinafter, wallpaper according to exemplary embodiments of the invention will now be described in detail with reference to the accompanying drawings.

Figure 1:
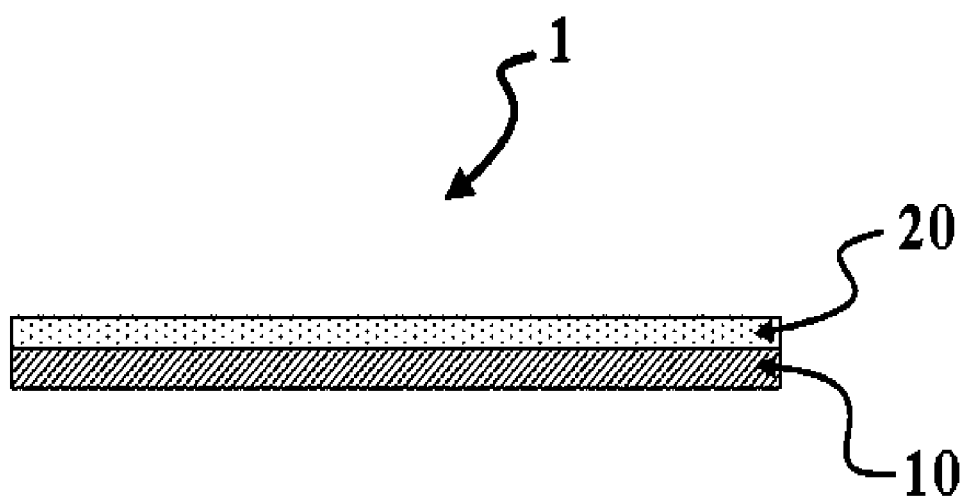
FIGS. 1 and 2 are schematic cross-sectional views of wallpaper according to exemplary embodiments of the present invention.

FIG. 1 illustrates wallpaper according to an exemplary embodiment of the invention. As shown in FIG. 1, the wallpaper 1 according to the embodiment includes a base sheet 10 and a resin layer 20 formed on the base sheet 10.

The base sheet included in the wallpaper is not limited to a specific kind. In one embodiment, a general material known in the related art may be used as the base sheet including a base sheet applied to conventional PVC wallpaper. For example, as the base sheet, vellum paper, non-woven fabric, or the like may be used. Examples of non-woven fabric may include, without being limited to, non-woven fabric made from synthetic fiber, such as polyester, non-woven fabric made from pulp, or complex non-woven fabric of polyester and pulp.

The base sheet may have a basis weight in the range of 80 $g/m^2$ to 200 $g/m^2$. When the basis weight of the base sheet is less than 80 $g/m^2$, the wallpaper may be torn or damaged when manufactured, formed, or used. When the basis weight of the base sheet is more than 200 $g/m^2$, the wallpaper is substantially heavy or curled, decreasing formation efficiency or surface detachment may occur on the resin layer and the base sheet.

The base sheet may have a thickness in the range of about 0.1 mm to about 0.3 mm. When the thickness of the base sheet is less than 0.1 mm, the wallpaper may be damaged in the course of manufacture, formation or use. When the thickness of the base sheet is more than 0.3 mm, formation efficiency may decrease. However, the above thickness of the base sheet is purely an illustrative example of the invention. That is, the thickness of the base sheet may be properly adjusted depending on according to use of the wallpaper.

The wallpaper includes the resin layer formed on the base sheet, and the resin layer includes a biodegradable resin. In the present invention, the resin layer may be formed by applying a coating solution including a biodegradable resin to the base sheet, followed by drying, maturing, and/or hardening. Alternatively, the resin layer may be formed by applying raw materials including biodegradable resin to extruding, calendering, or pressing processes to manufacture a resin layer, followed by lamination with the base sheet.

Any kind of biodegradable resin may be used for the resin layer so long as the resin can readily decompose in the natural environment and provide aesthetically pleasing appearance and flexibility to the wallpaper. Examples of a biodegradable resin to be used in the present invention may include: natural polymers, such as starch extracted from maize, potatoes, or sweet potatoes, and polymers (polylactic acid) including lactic acid or lactide produced from fermentation of the above starch; polymers synthesized by microorganisms, such as poly(lactic acid) (PLA), poly(hydroxybutyric acid) (PHB), poly(hydroxyvaleric acid) (PHV) or hydroxybutyric acid/hydroxyvaleric acid copolymer (PHBV); or chemically synthesized polymers, such as poly(lactic acid) (PLA), poly(caprolactone) (PCL), poly(butylene succinate) (PBS), poly(butylenesuccinate-co-adipate) (PBSA), and poly(butyleneadipate-co-terephthalate) (PBAT). Among them, PLA, PBS, PBSA, and PBAT may be used alone or as a mixture of at least two kinds, without being limited thereto.

In view of flexibility and enhanced biodegradability of the wallpaper, the resin layer may be formed of a composite resin of at least two kinds among the aforementioned biodegradable resins. In detail, the resin layer may include a first resin component containing PLA and a second resin component containing at least one selected from the group consisting of PBS, PBSA and PBAT. That is, the resin layer includes PLA as an essential element and additionally includes at least one resin selected from the group consisting of PBS, PBSA, and PBAT. When the resin layer is formed of the aforementioned composite resin components, the wallpaper may have optimal flexibility and excellent biodegradability, aesthetics, or the like.

In the present invention, when the resin layer includes the aforementioned composite resin components, the resin layer includes 10 to 500 parts by weight, preferably 10 to 250 parts by weight, more preferably 10 to 100 parts by weight, and still more preferably 10 to 60 parts by weight of the second resin component with respect to 100 parts by weight of the first resin component (PLA). When the content of the second resin component is less than 10 parts by weight, curling can occur during formation or use, or the resin layer can be considerably deteriorated in flexibility. When the content exceeds 500 parts by weight, heat resistance of the resin layer or resin components may decrease.

The resin layer may further include an inorganic component in view of heat resistance, moisture tolerance, and compatibility between components forming the resin layer, more preferably a nano-size inorganic component.

Examples of an inorganic component may include, but are not limited to, mica, talc, or clay, for example nano-clay. These components may be used alone or as a mixture of at least two kinds thereof.

The inorganic component may have an average diameter or average size of 1.0 nm to 100 nm. If the diameter or size is less than 1.0 nm, the inorganic component can cohere in the resin layer to reduce dispersibility. If the diameter or size exceeds 100 nm, effects of the addition of the inorganic component can be insufficient.

In the present invention, the content of the inorganic component may be 5 to 20 parts by weight with respect to 100 parts by weight of the biodegradable resin. When the content of the inorganic component is adjusted in this range, improvement in heat resistance, moisture tolerance, and compatibility due to addition of the inorganic component may be optimized.

In the wallpaper of the present invention, the resin layer may further include a plasticizer. The plasticizer may enable the resin layer to have excellent flexibility, impact resistance, and melting efficiency.

As the plasticizer, any plasticizer capable of performing these functions may be used. Advantageously, an environmentally friendly plasticizer may be used. Examples of a plasticizer may include phthalate compounds, citric acid compounds (e.g., citric acid, citrate ester, or the like), aliphatic ester, polyalkylene glycol (e.g., polyethylene glycol, polypropylene glycol, or the like), glycerol ester, vegetable oil, modified vegetable oil, allyl phosphate ester, dialkyl ether diester, tricarboxylic acid ester, epoxidized oil, epoxidized ester, polyester, polyglycol diester, allyl ether diester, aliphatic diester, alkyl ether monoester, dicarboxylic acid ester, and a mixture of at least two kinds thereof. Among these plasticizers, citric acid compounds, aliphatic ester, polyalkylene glycol, glycerol ester, vegetable oil, or modified vegetable oil may be used alone or in a mixture of at least two kinds thereof, without being limited thereto, in view of environmental friendliness.

In one embodiment, the modified vegetable oil may include epoxidized vegetable oil or other types of modified vegetable oil, for example, epoxidized soybean oil, specifically epoxidized methyl soyate (MSO), epoxydized linseed oil (ELO), epoxidized soy oil (ESO), or epoxidized tall oil (ETO).

In the present invention, the citric acid plasticizer may include, for example, triethyl citrate (TEC), acetyl triethyl citrate (ATEC), tripropyl citrate (TPC), acetyl tripropyl citrate (ATPC), tributyl citrate (TBC), acetyl tributyl citrate (ATBC), trihexyl citrate (THC), acetyl trihexyl citrate (ATHC), or a blend of citrate and modified vegetable oil, preferably ATBC, and more preferably a mixture of ATBC and modified vegetable oil.

In the resin layer, the plasticizer may be added at 5 to 60 parts by weight, preferably 5 to 50 parts by weight, more preferably 10 to 50 parts by weight, and even more preferably 15 to 40 parts by weight with respect to 100 parts by weight of the biodegradable resin. If the plasticizer is present at less than 5 parts by weight, improvement in properties due to addition of the plasticizer is insignificant. If the plasticizer is present at more than 60 parts by weight, the resin becomes excessively soft or processing becomes difficult.

According to an embodiment, the resin layer for the wallpaper may further include processing aids. The processing aids may improve melting efficiency, melt strength, viscosity, impact resistance, heat resistance, and mechanical strength, thereby enhancing compactness of the resin layer.

In this invention, the processing aids are not limited to a specific kind and any general component known in the related art may be used. Examples of processing aids may include a ter-polymer of a monomer mixture including methyl methacrylate (MMA). Herein, the term "ter-polymer" refers to a three-component copolymer produced from polymerization of MMA as a basic element with a monomer mixture including two other types of monomer.

In the present invention, the monomer mixture may further include alkyl(meth)acrylate as a component forming the ter-polymer. When the monomer mixture includes alkyl(meth)acrylate, alkyl(meth)acrylate may be one or two kinds of monomers other than MMA. Alkyl(meth)acrylate to be used in the present invention may include, without being limited to, for example, alkyl(meth)acrylate having a C1 to C18 alkyl group, specifically, methyl acrylate, ethyl(meth)acrylate, n-butyl(meth)acrylate, lauryl(meth)acrylate, stearyl(meth)acrylate, 2-ethylhexyl(meth)acrylate, or cyclohexyl(meth)acrylate.

In addition to these components, the monomer mixture may further include a functional monomer, specifically aryl (meth)acrylate, or a polyfunctional monomer. In this instance, the ter-polymer may be a copolymer of MMA, alkyl(meth)acrylate and a functional monomer. Here, aryl (meth)acrylate or the polyfunctional monomer are not limited to specific kinds, but may include, for example, phenyl(meth)acrylate, benzyl(meth)acrylate, 1,3-butylene glycol di(meth)acrylate, 1,4-butylene glycol di(meth)acrylate, divinyl benzene, ethylene glycol di(meth)acrylate, or diethylene glycol di(meth)acrylate.

When the monomer mixture forming the ter-polymer includes MMA and alkyl(meth)acrylate, the monomer mixture contains 60 to 86 parts by weight, preferably 75 to 85 parts by weight of MMA, and 14 to 40 parts by weight, and preferably 15 to 25 parts by weight of alkyl(meth)acrylate.

Further, when the monomer mixture includes MMA, alkyl (meth)acrylate, and the functional monomer, the mixture may include 60 to 86 parts by weight, preferably 75 to 85 parts by weight of MMA, 14 to 39.9 parts by weight, preferably 15 to 25 parts by weight of alkyl(meth)acrylate, and 0.0001 to 0.1 parts by weight, preferably 0.001 to 0.5 parts by weight of the functional monomer.

If the content of MMA included in the monomer mixture is less than 60 parts by weight, compatibility with the biodegradable resin decreases, thereby deteriorating processibility. If the content exceeds 86 parts by weight, initial dispersibility can be reduced when processed, causing non-uniform foaming.

Meanwhile, in the monomer mixture including the functional monomer, when the content of the functional monomer is less than 0.0001 parts by weight, the molecular weight of the ter-polymer decreases, such that improvement in foaming performance is ineffective. When the content exceeds 0.1 parts by weight, processing efficiency or foaming processibility may decrease.

The processing aids including the above components may have a weight average molecular weight of 500,000 to 8,000,000, preferably 1,000,000 to 5,000,000. If the weight average molecular weight of the processing aids is less than 500,000, improvement in properties by the processing aids is insignificant. If the weight average molecular weight exceeds 8,000,000, improvement in processability can be insignificant due to deterioration of melting efficiency.

Further, the processing aids may have a relative viscosity in the range of 4.0 cP to 12.0 cP. If a relative viscosity of the processing aids is less than 4.0 cP, foaming performance of the resin composition and stability of foamed cells can deteriorate. If the relative viscosity is more than 12.0 cP, processibility can decrease.

The relative viscosity of the processing aids may be obtained, for example, using an Ubbelohde viscometer with respect to a solution of a predetermined amount (e.g., 0.25 g) of the processing aids dissolved in a predetermined amount of solvent (e.g., THF, 50 ml) in a bath having a constant temperature of 30° C.

In the present invention, a method of preparing the processing aids may include, without being limited to, solution polymerization, photopolymerization, bulk polymerization, suspension polymerization, or emulsion polymerization using the above monomer mixture.

Preferably, the processing aids may be prepared by emulsion polymerization in order to produce the processing aids satisfying the above conditions. In the present invention, emulsion polymerization may be performed using general emulsifiers, polymerization initiators, or oxidation-reduction catalysts known in the related art.

The processing aids may be present at 1 to 60 parts by weight, preferably 2 to 40 parts by weight, and more preferably 5 to 30 parts by weight with respect to 100 parts by weight of the biodegradable resin. If less than 1 part by weight of the processing aids is present, improvement in properties due to the processing aids may be insignificant. If the content of the processing aids exceeds 60 parts by weight, processibility can be reduced due to decreased melting efficiency.

In the present invention, the resin layer of the wallpaper may further include a lubricant. The lubricant lubricates a surface of metal equipment, such as a calendar roller, to improve fluidity, prevents adhesion of resin to the metal equipment, improves slipping, and adjusts melt viscosity to improve formability when the resin layer is formed.

As the lubricant, any lubricant capable of performing these functions, for example, stearic acid or metal sterate (e.g., calcium stearate, magnesium stearate, or zinc stearate); ester or amide synthetic wax; hydrocarbons, such as montan wax, paraffin wax, or mineral oil; or silicon may be used, without being limited thereto.

According to the invention, the resin layer may include 0.01 to 30 parts by weight, preferably 0.1 to 20 parts by weight, and more preferably 1 to 10 parts by weight of the lubricant with respect to 100 parts by weight of the biodegradable resin. If the content of the lubricant is less than 0.01 parts by weight, improvement in formability due to the lubricant can be insignificant. If the content exceeds 30 parts by weight, printability of the wallpaper can be deteriorated due to low adhesion to ink, or lamination with a different layer can be difficult due to low layer adhesion.

The resin layer of the present invention may further include fillers. The fillers may be added to increase strength of the resin layer, to improve processibility, to give maintenance, and to reduce material costs.

Examples of fillers may include, but are not limited to, inorganic fillers, such as calcium carbonate, silica, or alumina; or organic fillers, such as woody fillers (e.g., wood flour and wooden chips), cork, kenaf, or pulp solely or in a mixture of at least two kinds. In the present invention, a mixture of organic fillers and inorganic fillers, preferably a mixture of calcium carbonate and wood flour may be used. Also, light inorganic fillers, such as perlite, or light organic filler, such as aerosol, may be further used to reduce product weight and decrease material costs. The fillers have excellent compatibility with the biodegradable resin and may be dispersed uniformly in the resin layer. Further, since the fillers have superior affinity with the plasticizer to control elution of the plasticizer, the content of plasticizer may be relatively increased in the resin layer and products may have excellent flexibility.

In the resin layer, the content of fillers may be varied according to use of the wallpaper, for example, 1,200 parts by weight or less, preferably 300 to 1,000 parts by weight, and more preferably 500 to 800 parts by weight with respect to 100 parts by weight of the biodegradable resin. If the content of fillers is excessively low, processibility, decrease of material costs, maintenance, and strength increase can be insignificant. If the content of fillers is excessively high, a bond of other components, such as resin, can decrease, thereby reducing processibility.

In one embodiment, the resin layer may further include additives, such as an antioxidant, an ultraviolet stabilizer, a foaming agent, a cross-linking agent, or a coloring agent, alone or in a mixture of at least two kinds according to use of the wallpaper.

Figure 2:
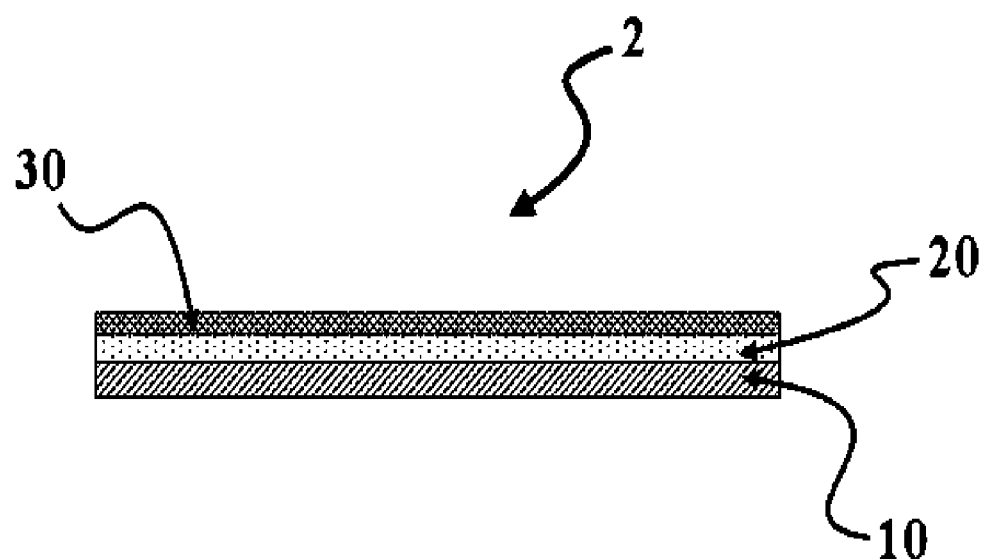

In one embodiment, as shown in FIG. 2, wallpaper 2 may further include a print layer 30 formed on a resin layer 20. As the print layer 30 is formed, the wallpaper has various patterns or colors, enhancing aesthetics. As a method for forming the print layer, any known method such as digital photo printing, gravure printing, screen printing, offset printing, flexographic printing, or rotary printing, may be used.

The wallpaper according to this embodiment may have an embossed pattern on the resin layer or the print layer. The embossed pattern may improve three-dimensional effects of the wallpaper. A method for forming the embossed pattern is not specifically limited. For example, the embossed pattern may be formed by rolling the resin layer or the print layer using a patterned roller, or mixing a suitable foaming agent with the resin layer, followed by foaming and gelling.

In the present invention, a method for manufacturing the wallpaper is not specifically limited. For example, any conventional method for manufacturing PVC wallpaper may be properly adopted to manufacture the wallpaper.

The method for manufacturing wallpaper may include forming a resin layer on a base sheet using a composition including a biodegradable resin.

In the present invention, a method of forming the resin layer using the composition including the biodegradable resin is not limited specifically.

For example, a base sheet is provided using a known means and coated with the composition including the biodegradable resin to have a proper thickness, followed by drying, maturing, or hardening processes, to form the resin layer. During the process, foaming or gelling processes may further be performed as necessary.

The biodegradable resin including composition or a coating solution may be prepared by mixing desired biodegradable resin, a plasticizer, and additives, adjusted in viscosity using a solvent.

A method of coating the base sheet with the biodegradable resin including composition or coating solution is not limited specifically. For example, the method may use a knife coater or roll coater.

In the present invention, the composition including the biodegradable resin may be formed into a film or sheet using extrusion molding, blow molding, compression molding, or calendering molding and laminated with a base sheet to form a resin layer on the base sheet. For example, while or after the composition is formed into a film or sheet using a T-die extrusion process, the film or sheet is laminated on a base sheet to form a resin layer.

After the above process, drying, maturing or hardening processes may be performed under conditions, which are not limited but may be selected properly based on proportions of used compositions.

In the present invention, predetermined stress may be applied to the provided base sheet, so that the base sheet is taut while the resin layer is formed. Accordingly, a coating process may be efficiently performed. Here, a method of applying stress to the base sheet is not limited specifically but, for example, a known instrument, such as an edge point control (EPC) may be employed.

In the present invention, after the formation of the resin layer on the base sheet, a printing process may further be performed on the resin layer to form the print layer. Here, a method of forming the print layer is not limited specifically but, for example, the above mentioned various printing methods may be used.

Also, in the present invention, before or after the formation of the print layer, a process of forming an embossed pattern on the resin layer or the print layer may further be performed. A method of forming the embossed pattern is not limited specifically but may use, for example, adding additives, such as a foaming agent, to the resin layer, followed by foaming and gelling, or rolling with a roller having an embossed pattern. When rolling is used to form the embossed pattern on the wallpaper, a pressure roller or steel roller may be used. Further, in the rolling process, the roller is controlled to give uniform pressure from side to side in order to minimize variations in thickness of the wallpaper on the right and left, but is not limited thereto. That is, the wallpaper may be formed to have different thicknesses at both sides thereof, as necessary.

MODE FOR INVENTION

Next, the present invention will be described in detail with reference to examples. However, it should be understood that the following examples do not limit the scope of the invention.

Example 1

10 parts by weight of an inorganic component (nanoclay) were mixed with 100 parts by weight of biodegradable resin containing poly(lactic acid) (PLA) and poly(butyleneadipate-co-terephthalate) (PBAT) at a weight ratio of 9:1, and other additives, such as a stabilizer, were properly added, thereby preparing a resin composition. The resin composition was formed into a resin layer using a T-die extrusion process, and the resin layer was laminated with a base sheet (vellum paper) having a basis weight of 100 g/m$^2$. Subsequently, a print layer was formed on the resin layer by gravure printing, and an embossed pattern is formed using a heated embossed roll, thereby producing wallpaper. Then, stiffness of the wallpaper was measured by a method stipulated in ISO 243. As a result, the stiffness of the wallpaper in a width direction (that is parallel with a roller of a wallpaper production line) was about 26.8 gf·cm, and the stiffness in a length direction (that is vertical to the width direction) was about 30.8 gf·cm. Accordingly, wallpaper having excellent flexibility and aesthetics is produced using the biodegradable resin of the present invention.

Example 2

Wallpaper was manufactured by the same method as in Example 1 except for use of a biodegradable resin containing PLA and PBAT in a weight ratio of 7:3. Then, stiffness of the wallpaper was measured by the same method as in Example 1. As a result, the stiffness in a width direction was about 18.3 gf·cm, and the stiffness in a length direction was about 20.9 gf·cm. Accordingly, wallpaper having excellent flexibility and aesthetics is produced according to the present invention.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

The invention claimed is:

1. A wallpaper comprising:
   a base sheet; and
   a resin layer formed on the base sheet and including a biodegradable resin, processing aids, and a lubricant,
   wherein the processing aids include a ter-polymer produced from a monomer mixture having 60 to 86 parts by weight of methyl methacrylate (MMA), 14 to 39.9 parts by weight of alkyl(meth)acrylate other than MMA, and 0.001 to 0.5 parts by weight of a functional monomer selected from the group consisting of aryl(meth)acrylate, a polyfunctional monomer, phenyl meth(acrylate), benzyl(meth)acrylate, 1,3-butylene glycol di(meth)acrylate, 1,4-butylene glycol di(meth)acrylate, divinyl benzene, ethylene glycol di(meth)acrylate and diethylene glycol di(meth)acrylate
   wherein the processing aids have a relative viscosity in the range of 4.0 cP to 12.0 cP, and
   wherein the processing aids have a weight average molecular weight of 500,000 to 8,000,000.

2. The wallpaper of claim 1, wherein the base sheet comprises vellum paper or non-woven fabric.

3. The wallpaper of claim 1, wherein the base sheet has a basis weight of 80 g/m2 to 200 g/m2.

4. The wallpaper of claim 1, wherein the base sheet has a thickness of 0.1 mm to 0.3 mm.

5. The wallpaper of claim 1, wherein the biodegradable resin comprises at least one selected from the group consisting of starch, poly(hydroxybutyric acid) (PHB), poly(hydroxyvaleric acid) (PHV), a hydroxybutyric acid/hydroxyvaleric acid copolymer (PHBV), poly(lactic acid) (PLA), poly(caprolactone) (PCL), poly(butylene succinate) (PBS), poly(butylenesuccinate-co-adipate) (PBSA), and poly(butyleneadipate-co-terephthalate) (PBAT).

6. The wallpaper of claim 1, wherein the biodegradable resin comprises a first resin component containing poly(lactic acid) (PLA) and a second resin component containing at least one selected from the group consisting of poly(butylene succinate) (PBS), poly(butylenesuccinate-co-adipate) (PBSA), and poly(butyleneadipate-co-terephthalate) (PBAT).

7. The wallpaper of claim 6, wherein the resin layer comprises 10 to 500 parts by weight of the second resin component with respect to 100 parts by weight of the first resin component.

8. The wallpaper of claim 1, wherein the resin layer further comprises at least one inorganic component selected from the group consisting of mica, talc, and clay.

9. The wallpaper of claim 8, wherein the at least one inorganic component has an average diameter of 1.0 nm to 100 nm.

10. The wallpaper of claim 8, wherein the resin layer comprises 5 to 20 parts by weight of the at least one inorganic component with respect to 100 parts by weight of the biodegradable resin.

11. The wallpaper of claim 1, wherein the resin layer further comprises a plasticizer.

12. The wallpaper of claim 1, wherein the resin layer further comprises a lubricant.

13. The wallpaper of claim 1, wherein the resin layer further comprises fillers.

14. The wallpaper of claim 1, further comprising: a print layer on a surface of the resin layer.

15. The wallpaper of claim 1, further comprising: an embossed pattern in the resin layer.

16. The wallpaper of claim 1, wherein the resin layer comprise 1 to 60 parts by weight of the processing aids with respect to 100 parts by weight of the biodegradable resin.

17. A wallpaper comprising:
a base sheet; and
a resin layer formed on the base sheet and including a biodegradable resin and processing aids, the biodegradable resin including 100 parts by weight of a first resin component containing poly(lactic acid) (PLA) to 10 to 60 parts by weight of a second resin component containing at least one selected from the group consisting of poly(butylene succinate) (PBS), poly(butylenesuccinate-co-adipate) (PBSA), and poly(butyleneadipate-co-terephthalate) (PBAT);
wherein the processing aids include a ter-polymer produced from a monomer mixture having methyl methacrylate (MMA), alkyl(meth)acrylate other than MMA, and a functional monomer selected from a group consisting of aryl(meth)acrylate and a polyfunctional monomer, and
wherein the processing aids have a weight average molecular weight of 500,000 to 8,000,000.

18. The wallpaper of claim 17, wherein the biodegradable resin includes a 9:1 ratio by weight of poly(lactic acid) (PLA) to poly(butyleneadipate-co-terephthalate) (PBAT).

19. The wallpaper of claim 17, wherein the biodegradable resin includes a 7:3 ratio by weight of poly(lactic acid) (PLA) to poly(butyleneadipate-co-terephthalate) (PBAT).

* * * * *